9154X
G. Pack,
Making Staves.
Patented Oct. 10, 1835.
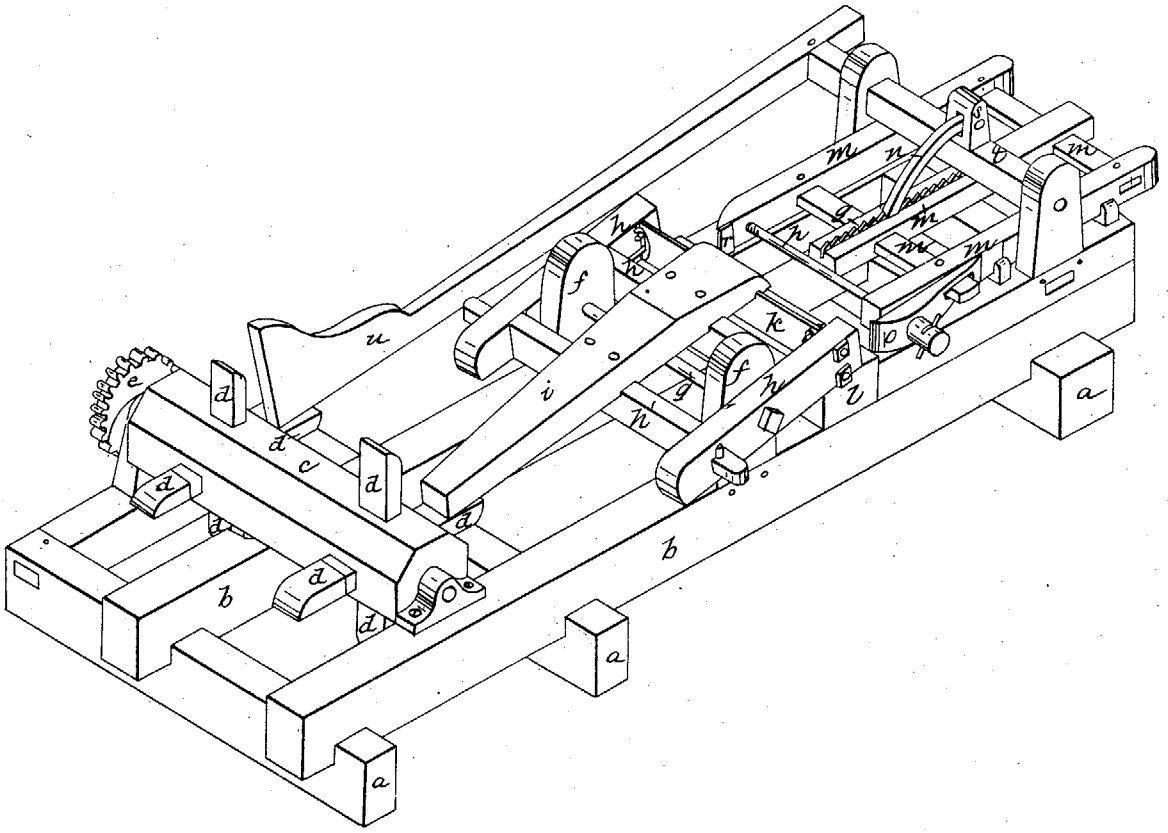
AM. PHOTO-LITHO. CO. N.Y. (OSBORNE'S PROCESS)

George Packe
Letters Patent

The Schedule referred to in these Letters Patent and making part of the same containing a description in the words of the said George Packe himself of his improvement in the machine for cutting Staves from steamed timber.

To all to whom these presents shall come.

Be it known that I George Pack of Sullivan in the County of Madison and State of New York have invented a new and useful improvement in the manner of making Staves and that the following is a full and exact description of the construction and operation of the machine used for that purpose viz Though it is necessary to premise that the timber either in the shape of bolt plank rived block or sawed stuff, is to be steamed first previous to presenting it to the action of the machine. And this is best done after it is cut off to the required length. Boiling may be employed instead at the option of the operator, the intention being to render the wood so yielding and tough or elastic as not to split as the knife pass through. In the construction of the machine I first make a long frame consisting of two pieces of timber forming the sides to be fixed upon cross sills at each end. At one end of this frame is secured a revolving shaft properly secured in boxes; one placed on a side piece and the other on a[illegible] additional one attached to the opposite end of the cross sills which then project beyond the side piece for that purpose, [a cog wheel is here added to the end of the shaft for the purpose] of gearing on to the propelling power (which may be discretionary) The shaft is to be furnished with rows of arms or cogs for the purposes hereafter described. At a little distance beyond this shaft is to be placed an upright on each side piece & through the tops of these another small shaft is to pass from one to the other & projecting a short distance beyond each, these projections form

9154X form pivots on which is to swing the knife frame consisting of two
sides connected by cross piece having the pivots playing a little
in advance of the centre of the sides. On the top of the cross pie-
ces & parallel with the sides, are placed one or more levers suffi-
ciently long to reach from one or more rows of cogs on the main re
volving shaft (and on which the ends of said levers rest)
to the other end of the knife frame where they press upon the
back of the knife placed below them & extended from one end
of the side piece to the other opposite one. This knife [illegible] consists
of a broad flat blade as long as the staves and having the lower
edge sharp and extended edgewise across the frame. A little
beyond this balancing knife (which has also a broad block
extended from one side piece of the main frame to the other di-
rectly under it) is placed a feeding carriage somewhat after
the fashion of a saw mill consisting of two sides & a middle piece
(something shorter) connected together horizontally by cross
pieces so as to form another frame narrower and longer than the
knife one. At the ends of these sides next the knife are
placed iron plates on the inside which are roughened the
better to answer their purpose of holding the bolt or piece of
stuff to be cut up between them and to this end they
form jaws, one being a movable one, by placing it outside
of the side piece & to play as a joint on the end of the cross
piece situated at that end. A long screw rod is to
pass through them by turning which they may be tight-
ened together or relaxed at pleasure. On the centre short
middle piece is placed a rack and over it a hand
which by being thrust forward advances the carriage on
the slide & groove beneath it & this hand joins loosely
on to an uprights rising from an horizontal axle play-
ing above the fusing Carriage and between two uprights
secured into the side pieces of the main frame. At the
end of this axle is secured permanently a long lever which which reaches to the row of cogs on the end of the main
shaft extended beyond the sides of the main frame for that
purpose. Operation. The steamed timber being placed
between the jaws of the feeding frame the main axle is set [illegible]
in motion and the rows of cogs next the wheel raises the
long lever resting thereon which by its connection &c with
the hand draws it back and then -- the weight of the lever
on falling beyond the cog on the axle advances the said
hand and consequently with it the piece of steamed or boiled
timber contained between the jaws. The passage of the cogs
upon the axle also raises up the ends of the lever laid on top
of the knife frame: this balances on its pivot and consequent
ly forces down the knife at the opposite end through the
piece of timber. the front side of the knife having that part
rounded so as to allow it to advance freely through the wood, +
& the knife edge presses on the whole length of the stave (which
rests across the frame) so as to divide the whole length with
the grain at once. The rapidity of motion of the knife
frame will depend on the number of cogs. (What I claim
as my) invention in the above described operation is - The for-
mation of staves from steamed or boiled wood, cut with
an edge tool or knife after the manner and according to
the combination above set forth in my machine, consists
of the main axle and the feeding frame to operate with
the knife frame of which I claim the construction and use
as adapted to the purpose above mentioned. In testimony
that the above is a full and exact description of the con-
struction and operation of my machine as invented or im-
proved by me. I have hereunto set my hand this eight=
day of September, Eighteen hundred and thirty five Witnesses
B. H. Morsell
Henry Stone George Pack (Drawing)

1034 wds.]

Ex [illegible]